Figures 1, 2:
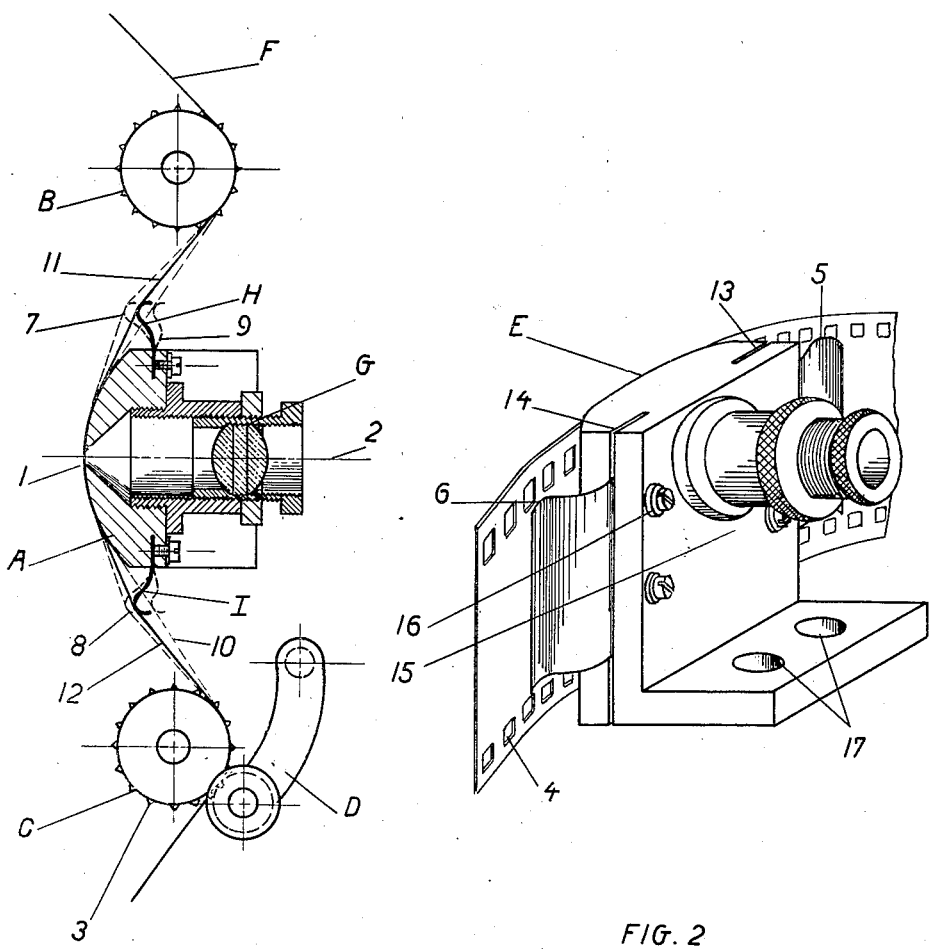

May 28, 1935.　　　　　　L. DAY　　　　　　2,003,276
MEANS AND METHOD OF PRODUCING UNIFORM MOTION IN A SOUND FILM
Original Filed May 3, 1930　　3 Sheets-Sheet 1

INVENTOR
LEONARD DAY
BY
ATTORNEY

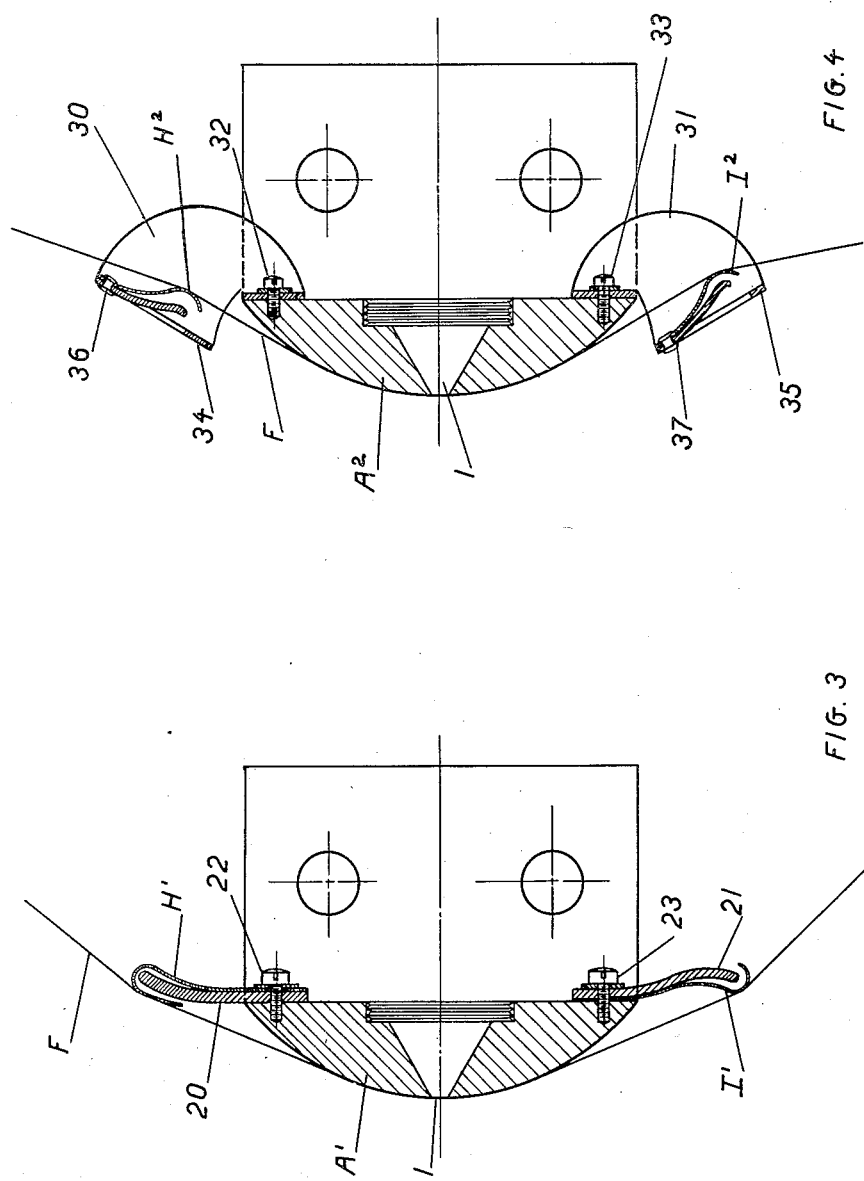

May 28, 1935.  L. DAY  2,003,276
MEANS AND METHOD OF PRODUCING UNIFORM MOTION IN A SOUND FILM
Original Filed May 3, 1930  3 Sheets-Sheet 3
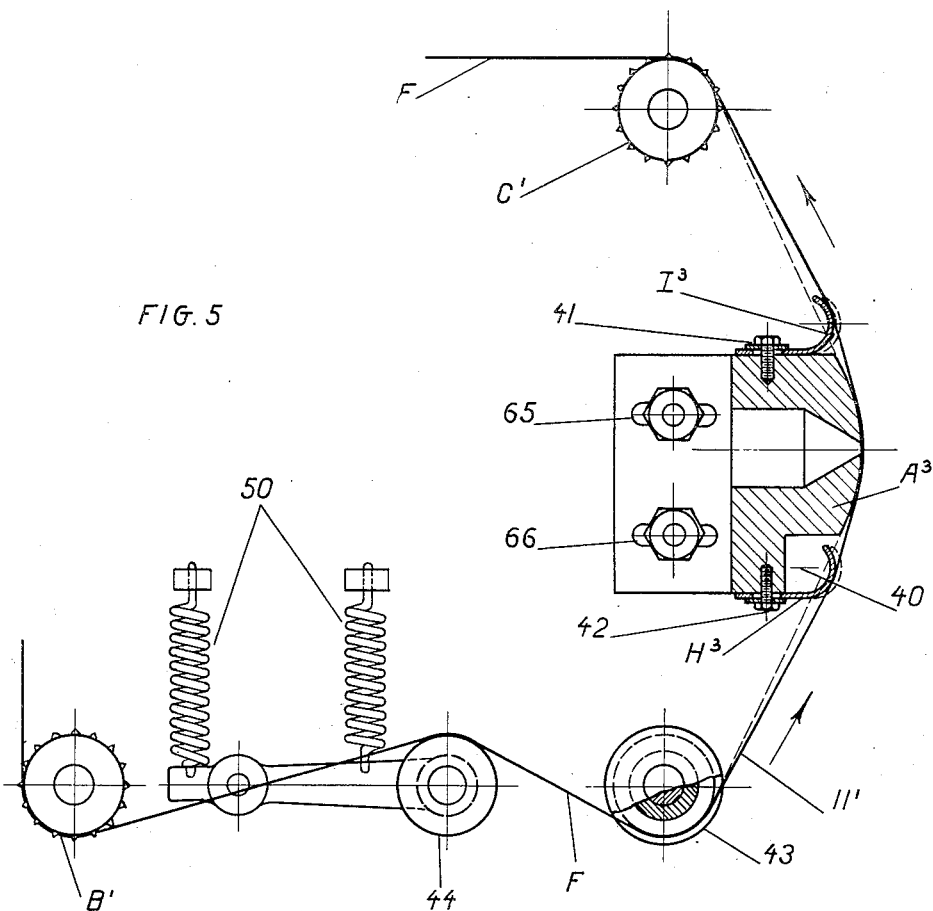
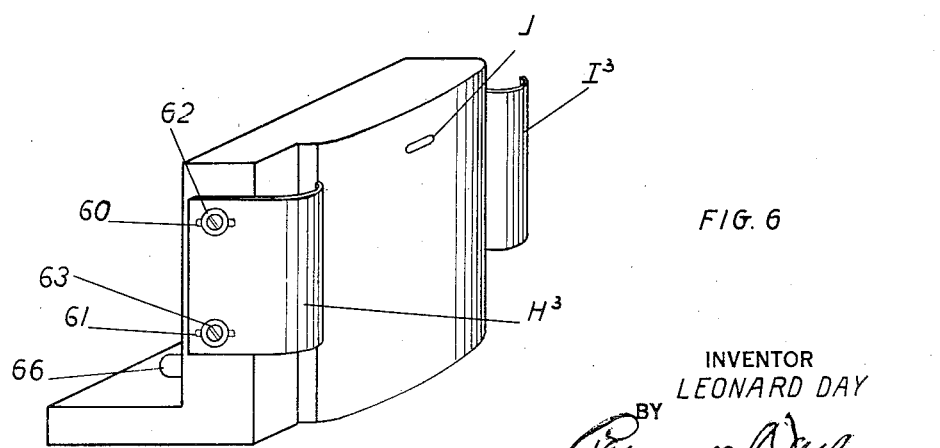
INVENTOR
LEONARD DAY
BY
ATTORNEY Pro Se

Patented May 28, 1935 2,003,276

UNITED STATES PATENT OFFICE 2,003,276

MEANS AND METHOD OF PRODUCING UNIFORM MOTION IN A SOUND FILM

Leonard Day, New York, N. Y., assignor to Polytechnic Development Corporation, a corporation of New York Application May 3, 1930, Serial No. 449,656
Renewed April 13, 1934

10 Claims. (Cl. 271—2.3)

This invention relates to the moving of a strip usually in the form of a sound-on-film motion picture film continuously instead of at an approximate continuous speed with slight ripples or fluctuations.

In sound-on-film cameras and projectors in which photographs of sound vibrations occupying less than 1/1000 of an inch of the linear extent of the film are involved, it is obvious that fluctuations or speed ripples of even such a small amount as to be limited to a variation of a fraction of 1/1000 of an inch constitute a disturbing and distorting effect upon a photographic sound record although the average traverse of the film is continuous.

If the film is free to move across or through a sound gate by itself and not as a substantially integral part of a moving system possessing a large amount of inertia or momentum as by constituting a wrapping in non-slipping frictional engagement with the surface of a rotating cylinder, the mass and consequently the inertia of the film itself is so slight that ripples or variations in the dragging or feeding effort of such a short length of film are readily translated into variable translation speed ripples in that length of film itself and actually in the portion traversing the sound gate when such gates are in the form of anti-friction sliding surfaces. It has been found that the engagement and disengagement of the sprocket teeth of a driving sprocket through the perforations of a standard film is sufficient to cause a translation speed ripple in the film so fed although it is highly desirable that the film traverse across the sound gate be strictly uniform.

There are many advantages incident to the use of a stationary curved gate across which the film slides with little retardation (celluloid side in contact with the curved guiding surface of the gate). In one respect it is the duty of this curved surface to oppose little friction to the travel of the film which makes possible the transmission of a translation ripple from the teeth of the forward driving to the film portion actually at the surface of the gate. Attempts have been made specially to form the teeth of the film sprockets to minimize their ripple tendency, but I have found that standard sprockets may be used without trouble from the ripple and while utilizing all the advantages of the curved gate. Heretofore, slack takeup devices providing resilient engagement with the film have been employed. Such devices embody a pivoted arm and a roller spring urged into forcible engagement with the film. Such a contrivance has a natural period of oscillation and, on account of its substantial mass and necessary length of lever arm, has a normal low period of vibration besides possessing so much inertia in its roller that disturbances such as a sprocket tooth ripple are transmitted through the film over such a roller, or rather, across such a roller. Even if the friction at the sound gate is increased to a large extent, the sprocket tooth ripple from the driving or drawing sprocket can not be eliminated because the aberration due to the sprocket teeth includes pauses or de-accelerations of speed as well as positive accelerations of speed, and for a normal sprocket fitted with sixteen sprocket teeth about the circumference rotating at six rotations per second, these positive and negative accelerations must occur ninety-six times per second, a vibratory speed far more rapid than that capable of being responded to by an ordinary commercial slack takeup arm, however light its construction may be made.

I have found that the converse of the proposition of wrapping film about a friction cylinder constrained to rotate with large inertia (momentum) is equally effective in eliminating sprocket tooth ripple, in fact all speed variation within the capacity limit of my force couple arrangement. I mean by the converse the actual taking up of the ripple by varying the length of traverse of the stretch of film subjected to the ripple between the ripple producing means and the guiding surface of the gate where its speed of translation must be constant, and by varying this length of traverse in the form of a varying deflection by means of a force substantially divorced from inertia. The means readily available for providing such a deflecting force is a light substantially inertialess leaf spring of short length arranged to engage with a sliding shoe formation (made by suitably bending the spring) preferably only the portion of the film within the sprocket tooth perforations and preferably against the celluloid or non-emulsion side of the film. By this expedient, the slight frictional retardation of the film in its engagement when passing over the curved sound gate is employed to react against the dragging movement of the driving sprocket ahead of it and it is only within the realm of this slight retarding force that my deflecting spring mechanism must function. I select, proportion, mount and tense my deflecting spring or springs so that the stretch of film from the driving sprocket to the gate with the film in motion is deflected out of the normal straight line path, that is, the spring deflecting resilience should be less than enough with the deflection of my spring deflector to overcome the frictional retard of the film so that the retard of the film actually causes a deflection of my deflecting spring from its maximum deflecting position to an intermediate position still out of the straight line path. Thus, when a sprocket tooth tends to drag the film along with a de- or negative acceleration, the tense spring deflects the film out of the straight line pathway an increment further away from a straight line which tends to maintain the constant speed of traverse over the gate. Thus, also, when the driving or dragging sprocket teeth exert a positive acceleration, my spring deflector yields a little or an increment closer to the straight line pathway and takes up this positive increment of acceleration at the driving sprocket still maintaining the constant speed at the sound gate. By the employment of the leaf spring deflector I have approached a means for providing a deflecting force substantially free of inertia and at least one which has a natural speed of vibration so much higher than the necessary ninety-six cycles per second as to introduce no disturbance upon its compensating deflecting functioning.

I have thus far described the effect of the tooth ripple and my method of overcoming it in connection with the driving or dragging sprocket. In connection with the feeding sprocket which feeds the film into the sound gate, a similar disturbing ripple may be introduced into the film. Thus, in the preferred embodiment of my invention I prefer to use the deflecting compensating inertialess spring mechanism both between the feeding-in sprocket and the sound gate and between the driving or drawing sprocket and the sound gate.

A further object of the invention is to render the threading of a machine of this character more nearly foolproof. It is possible to arrange the deflecting springs so that when the film is engaged across the sound gate upon the feeding and driving sprockets the normal and natural positioning of the film perforations in the teeth of the sprockets tenses the spring deflectors just the required amount to produce the desired closeness of contact between the film and the curved sound gate without the use of the usual spring tension arm, while at the same time, my spring deflectors take up the ripple both of the feeding sprocket and of the drawing sprocket.

A further object of my invention is to improve in general the sound gate construction and the feeding of film to and from such a gate and will be pointed out more particularly in the accompanying claims which are directed to illustrative embodiments of the invention described in the following specification in connection with the accompanying drawings, solely for purposes of illustration and not limitation.

In the drawings, Fig. 1 is a diagrammatic vertical side view partly in vertical section illustrating the invention; Fig. 2 is a positive view of a sound head adapted to function in accordance with the invention; Fig. 3 is a fractional view similar to Fig. 1 showing a modification; Fig. 4 is a fractional view similar to Fig. 1 showing another modification; Fig. 5 is another view similar to Fig. 1 showing still another modification; and Fig. 6 is a perspective view illustrating the gate construction of Fig. 5.

In connection with the showing in Figs. 1, 2, 3, 4 and 6, it is to be understood that the means for causing the traverse of the film may be that illustrated either in Fig. 1 or in Fig. 5 or for some purposes may be any suitable means for causing the traverse of the film across a sound gate.

In Fig. 1, the sound gate A is positioned between the feeding sprocket B and the driving or drawing sprocket C which may or may not, according to convenience, be provided with a pad roller D. These sprockets B and C permit and cause and guide the traverse of the film F across the cylindrically curved guide face E of the sound guide or gate. The type shown is the type in which the adjustable lens system G focuses a light line on the film F at the locality 1, the axis of the lens system being indicated by the line 2. It is the film part 1, sliding over the fixed curved guiding surface E, which objectively moves at absolutely uniform constant speed, while it is actually the sprocket teeth 3 engaging in the film perforations 4 which permit and effect the film travel. If the film F were tensed in the traverse shown in Fig. 1 between the sprockets B and C about the guide A, the traverse from each sprocket to the guide A would be in a straight line path but for the application of the present invention.

In accordance with the present invention, two leaf springs H and I, preferably of thin sheet spring steel, are each formed to provide a contact shoe 5 or 6. The dotted lines 7 and 8 indicate the outward extreme of deflection for these springs and their engaged film stretches, while the dotted lines 9 and 10 indicate the extreme inward positioning for the springs and their contacting film traverses (the straight line path for the film traverses). The full line position indicated in Fig. 1 shows the preferable functioning position for the film stretches and the controlling springs. It is, of course, to be understood that the three positions illustrated in the diagram are greatly exaggerated in extent inasmuch as the complete deflection of these film stretches may be only a few thousandths of an inch in functioning to overcome ripple. Usually the ripple is exaggerated or occasioned not solely by reason of the fact that a sprocket tooth engages in a sprocket tooth perforation in the film, but by reason of the fact that the stretch or the shrinkage of the film causes an actual inequality in the length of film between perforations relatively to the distance between sprocket teeth. This stretch or shrinkage may amount to as much as several feet in a thousand foot length of film which, of course, is substantially equally divided between the thousands of uniformly spaced perforations. Thus, a constant compensation between the constant circumferential extent about a sprocket must take place as the film traverses a sprocket, and this compensation does not take place continuously relatively to the actual linear extent of the film, but takes place step by step, one tooth perforation at a time and has been known to cause serious disturbance or rippling of the film speed at the locality 1.

In accordance with the present invention, if the teeth of the sprocket C first cause a negative acceleration or retardation from the average speed of traverse of the film F, the spring I forces the film stretch 12 out towards the position 8 without interrupting its traverse over the shoe or sliding surface 6 and thus takes up what otherwise would be a minute slack and effects a continuation of the film traverse or movement at the locality 1 at its uniform speed. If and when the effect of a tooth or any other cause is to tend to make the film at the locality of the tooth take on an increment of positive acceleration, the film stretch 12 tends to straighten out and compress the spring I towards the position 10. Likewise, when a similar effect is had from the teeth 3 of sprocket B, the film stretch 11 is deflected either towards the position 7 or allowed to straighten out towards the position 9, killing or annulling the ripple effect in the pull-back on the film as it approaches the locality 1. By this functioning and by these provisions, the film F reaches and passes the locality 1 across the guide face E where it is bent into a stiff cylindrical form with no tendency for an uneven rate of speed and likewise the dragging or propelling force imparted to the locality 1 of the film through the stretch 12 is rendered uniform respectively to permit and tend to cause an absolutely uniform film traverse across the locality 1.

In the construction illustrated, the substantially inertialess deflectors 5 and 6 are mounted in notches 13 and 14 where they may be held in place in any suitable manner as by set screws 15 and 16, it being understood that the film guide or gate A is mounted fixedly with or without adjustment as desired upon the frame of the machine as by bolts extending through the perforations 17.

In the modification of Fig. 3, a gate $A^1$ is understood to be associated with two sprockets positioned and similar to the sprockets B and C while the inertialess deflectors take the form $H^1$ and $I^1$ and may likewise be constructed of any extremely resilient sheet material such as sheet spring steel. Each of these deflectors is reinforced by a stiff shaped plate 20 and 21 respectively providing a seating surface coextensive with each spring respectively and shaped to fit each spring contour. The functioning of these plates 20 and 21, which are preferably of stiff, strong material stamped to shape, is to protect the light leaf springs from overbending beyond the point of resilient comeback. Attaching screws 22 and 23 are here employed, preferably two for each spring, to mount them directly to the sound gate $A^1$, although it is, of course, to be understood that the mounting may be upon any suitable fixed structure in the camera or projector apparatus.

In the modification of Fig. 4, out-rigger brackets 30 and 31 are provided and are detachably secured to the sound gate $A^2$ as by screws 32 and 33. These out-rigger brackets each provide a ledge 34 and 35 respectively overlying the emulsion side of the film or the film side not in contact with the sound gate $A^2$, and it is upon these ledges that the spring deflectors $H^2$ and $I^2$ are secured in any suitable way as by screws 36 and 37. These springs tend to deflect the film F inwardly or in the opposite deflection from that of the construction shown in Figs. 1, 2 and 3 and likewise permit the threading of the film from the front as viewed in Figs. 1, 3 and 4.

In the construction of Fig. 5 the traverse of the film F is opposite to that in Fig. 1 while the sound gate $A^3$ is also modified in that it is notched out by formation 40 to provide for the upwardly turned resilient spring member $H^3$. The second resilient deflector $I^3$, like the deflector $H^3$, is attached to the side of the sound gate as by a screw 41 or 42. In this construction a flanged idler guide roller 43, turning on a fixed stub shaft, is provided to impart the desired angle for the film stretch $11^1$. In this construction, a tensioning roller 44 is also provided while the feeding sprocket $B^1$ is not symmetrically positioned relatively to the driving or drawing sprocket $C^1$, but is spaced apart from the sound gate and has interposed between it and the sound gate the two idlers 43 and 44. In this construction it is to be understood that the deflector springs $H^3$ and $I^3$ are greatly exaggerated as to their thickness and are in reality thin, light leaf springs of resilience sufficient to resist the tension in midposition of the stress imparted to them through the film F from the tensioning urge of the spiral springs 50.

In this construction the inertia of the arm and roller 44 is too great to flutter at the high period occasioned by the sprocket tooth ripple from sprocket $B^1$, although the construction shown in Fig. 5 in a measure eliminates the sprocket tooth ripple by the momentum or momentum inertia of the rotationg parts 43 and 44 which tend, on account of their mass, to rotate at a constant speed equal to the average speed of traverse of the film. Whatever ripple passes these rollers due to film slippage is compensated by the deflector $H^3$.

Fig. 6 shows a preferred location of the window J through which the light line is projected upon the film either for purposes of photographing or reproducing while there is also shown in this figure a provision in the form of the slots 60 and 61 for adjusting the positioning of the deflectors $H^3$ and $I^3$. It is, of course, obvious that the adjustment through the provision of the slots 60 and 61 is by means of the clamping screws 62 and 63. These figures also show the slotted arrangement 65 and 66 permitting adjustment of the sound gate $A^3$.

Although I have illustrated and described a substantially inertialess deflector spring or flutter spring H, $H^1$, $H^2$ or $H^3$ between the sound gate and the driving sprocket, and in addition, a similar substantially inertialess deflector spring or flutter spring I, $I^1$, $I^2$, or $I^3$ between the sound gate and the film feeding mechanism, it is a fact that either one of these springs alone without the other has a very useful function. I have also found that my invention under the principles of mechanics utilizes what may be termed a force couple made up of three forces. One force is the feeding force of the feeding mechanism or sprocket which tends to pull the film in the direction of its length with a more or less non-uniform acceleration. Directly opposing this force is the frictional retardation of the film across the sound gate and through whatever mechanism there may be, all tending to oppose the traverse of the film substantially uniformly. The third force of the couple is the deflecting force of the flutter spring tending to deflect the traverse of the film out of a straight line or, upon yielding, to permit the film traverse to assume more nearly a straight line.

What I claim and desire to secure by United States Letters Patent is:

1. Means in combination for eliminating ripple due to sprocket teeth engagement with a motion picture film of the type employing a sound-on-film record comprising means providing a film guiding surface at the locality at which it is desired that the film move continuously without ripple; a film engaging sprocket; a substantially inertialess spring deflector positioned intermediate said sprocket and said guiding surface, offset from the plane tangent to said sprocket and to said guiding surface and adapted to engage said film and deflect it at a slight angle from the straight line direction of said tangent plane and functioning from tensed resilience to increase the deflection of said film and by yielding to decrease the deflection of said film in response to the plus and minus influences upon said film of the teeth engagement of said sprocket, whereby substantially uniform motion of said film over said guiding surface is effected.

2. In combination in a sound-on-film camera or projector, two separated film engaging sprockets; means providing a guiding surface over which guiding surface it is desired that the film move without ripple in a uniform continuous motion; resilient means substantially without inertia through out its entire moving extent providing itself a deflecting surface for engaging one face of the film and deflecting said film out of and yielding it towards the plane of tangency from the said sprockets and said guiding surface, whereby a tendency to slack in said film from the tooth engagement of the adjacent sprocket is compensated by an increased deflection of said film and whereby a tendency to tense is compensated by a negative increment of deflection in said film.

3. The combination and structure as characterized in claim 2 and further characterized by the fact that two substantially inertialess deflecting means are employed, one between the first sprocket and the guiding surface and one between the second sprocket and the guiding surface.

4. In apparatus adapted to move elongated strips with continuous motion across a predetermined locality, mechanism for moving said strip across said locality at a substantially uniform continuous linear speed but subject to high frequency variations; means tending to overcome said high frequency variations including a resilient, unloaded substantially inertialess deflector interposed between said locality and the part of said means tending to introduce said variations and exerting a continuing yieldable deflecting force upon said strip whereby said strip at said locality tends to move absolutely continuously and constantly at speed without high frequency variations which are taken up in the form of lateral fluctuations of said strip from the straight line path which would otherwise be its path without said deflecting means.

5. In a sound-on-film motion picture camera or projector, a driving sprocket; a guiding surface in rear of said sprocket at which guiding surface it is desired that the film move continuously without ripple whereby the plane of tangency between said driving sprocket and said guiding surface constitutes a straight line path therebetween; means for exerting a substantially inertialess laterally deflecting force upon said film in the form of a leaf spring forming a sliding shoe adapted to engage said film between said guiding surface and said sprocket and to deflect the film out of the straight line path between said surface and said sprocket and to increase and yieldingly decrease said deflection in response to the ripple variations from high frequency accelerations of said sprocket.

6. In a sound-on-film motion picture camera or projector, means providing a guiding surface at the locality at which it is desired that the film move continuously and uniformly without fluctuation in speed; a sprocket for drawing said film across said guiding surface purposefully in a straight line path between said sprocket and said surface and at a substantially uniform speed, but being subject to slight high frequency accelerations; means for exerting upon said film at or in the rear of said guiding surface a force negative relatively to the travel of said film; and means tending to deflect and actually deflecting said film from the straight line path between said sprocket and said guiding surface when in operation, which means is substantially entirely free of inertia and functions to yield an average amount in response to the aforesaid retarding force and functions further to yield to permit the film-traverse more nearly to approach a straight line upon an increase in the dragging tension from said sprocket and itself to deflect the film further out of a straight line path upon a decrease in the dragging tensions from said sprocket, all in accord with the aforesaid high frequency accelerations.

7. Means for driving a long strip with uniform motion from a non-uniform driving force comprising a sprocket tending to draw said strip at average uniform speed subject to high frequency small fluctuations; provisions tending to retard or hold back the movement of said strip; and a light, substantially inertialess leaf spring with its tip forming a contact shoe pressed into engagement with one side of said strip and normally deflecting said strip out of what otherwise would be a straight line path but being resiliently deflected an average amount during the travel of said strip whereby slight increases in the driving force from said sprocket cause slight rythmic deflections of said spring with corresponding straightenings of said strip and slight decreases in said driving force of said sprocket cause said spring to effect rythmic compensating increased deflections of said strip from said straight line course, all tending to transform non-uniform motion into uniform motion by the principal of a force couple.

8. The method of compensating small accelerations in the driving of a moving strip comprising exerting a substantially constant but slightly fluctuating dragging force upon said strip; at the rear subjecting said strip to a retarding force; causing a portion of said strip to tend to travel in a straight line path; deflecting said portion of said strip from said straight line path by a slight force applied normally to said portion of said strip, which force is adjusted to permit said portion of said strip to approach a straight line path upon slight increases in said dragging force and to deflect said portion of said strip more out of a straight line path upon slight decreases of said dragging force, said deflecting force being substantially inertialess, whereby response to high speed variations is practicable.

9. In a sound projector, a sound gate at the locality of which film should move at uniform speed; means having sprocket teeth for drawing the film across said sound gate; means for tensing said film between said sound gate and said sprocket; and a leaf spring fixed at one end and with its free end engaging said film between said sprocket and said sound gate and functioning to vary the deflection of said film in accordance with sprocket tooth engagement and disengagement.

10. In a sound-on-film sound projector, a sprocket adapted to draw the film by the engagement of sprocket teeth and an unloaded substantially inertialess leaf spring fixed at one end and free at the other end for filtering the fluctuating tension upon said film.

LEONARD DAY.

CERTIFICATE OF CORRECTION.

Patent No. 2,003,276.  May 28, 1935.

LEONARD DAY.

It is hereby certified that error appears in the printed specification of the above numbered patent requiring correction as follows: Page 4, first column, line 15, claim 2, for the words "through out" read throughout; and line 19, of same claim, for "the" read one of; and that the said Letters Patent should be read with these corrections therein that the same may conform to the record of the case in the Patent Office.

Signed and sealed this 16th day of July, A. D. 1935.

Leslie Frazer (Seal)  Acting Commissioner of Patents.